US011144440B1

(12) United States Patent
Daniali (10) Patent No.: US 11,144,440 B1
(45) Date of Patent: Oct. 12, 2021

(54) IMPLEMENTING DEVICE-SPECIFIC LIBRARIES FOR VALIDATION TESTING

(71) Applicant: T-Mobile USA, Inc., Bellevue, WA (US)

(72) Inventor: Ali Daniali, Tukwila, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/000,152

(22) Filed: Aug. 21, 2020

(51) Int. Cl.
  *G06F 11/36* (2006.01)
  *C40B 40/18* (2006.01)
  *G06F 8/36* (2018.01)

(52) U.S. Cl.
  CPC .......... *G06F 11/3688* (2013.01); *C40B 40/18* (2013.01); *G06F 8/36* (2013.01); *G06F 11/3664* (2013.01)

(58) Field of Classification Search
  None
  See application file for complete search history.

(56) References Cited

U.S. PATENT DOCUMENTS

| | | | | |
|---|---|---|---|---|
| 2016/0173816 A1* | 6/2016 | Huenerfauth | .......... | G16H 40/40 348/14.02 |
| 2019/0196940 A1* | 6/2019 | Psiaki | .................... | H04W 4/027 |
| 2019/0278697 A1* | 9/2019 | Sharma | ................. | G06F 11/323 |
| 2019/0354643 A1* | 11/2019 | Shum | ...................... | G06F 30/12 |
| 2021/0065577 A1* | 3/2021 | Daniali | ..................... | G06T 7/90 |

OTHER PUBLICATIONS

Bierbaum, "Automated Testing of Virtual Reality Application Interfaces", 2003, Eurographics Workshop on Virtual Environments (Year: 2003).*
Getty, "Virtual Reality QA Testing: What toTest and Why", 2020, QASource Blog (Year: 2020).*

* cited by examiner

*Primary Examiner* — Hossain M Morshed
(74) *Attorney, Agent, or Firm* — Han Santos, PLLC (57) ABSTRACT

Techniques are described herein for implementing device-specific libraries to perform validation testing for XR applications executing on various XR capable devices. The techniques include receiving an XR application executing on an XR capable device. The XR application utilizes one or more software modules that are integrated into the XR application. One or more validation tests may be performed for the XR application in response to a request. The request can at least specify usage of the one or more software modules corresponding to the XR capable device and testing specifications corresponding to the XR capable device. The XR application is mapped to the one or more software modules and the one or more validation tests are executed for the XR application according to the testing specifications. Test results from the one or more validation tests are reported to a testing log via the one or more software modules.

20 Claims, 5 Drawing Sheets

IMPLEMENTING DEVICE-SPECIFIC LIBRARIES FOR VALIDATION TESTING

BACKGROUND

Software validation is determining if a system complies with the requirements and performs functions for which it is intended and meets an organization's goals and user needs. Validation is typically completed at the end of a software development process and is performed after a software product is produced against established criteria to ensure that the product integrates correctly into the environment. However, validation may also be employed during testing, provisioning, updating, patching, and so on.

In many cases, validation process and testing may be performed for these various scenarios on a number of user devices operating under different network conditions as organizations may wish to perform tests to validate certain configurations, modifications, patches, or bug fixes to properly supply the functionality desired by organizations and users alike. Additionally, the user devices may be produced by various Original Equipment Manufacturers (OEMs) that maintain different device-specific testing specifications. As a result, supporting the validation process and testing can require specialized equipment and a wide range of resources.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Techniques are disclosed for onboarding XR capable devices for performing validation testing. In one example, the validation process and testing may be applied to an extended reality (XR) application executed on one or more user devices or XR capable devices. As used herein, "XR" refers to all real and virtual environments generated by computer graphics and wearables. The "X" in XR is simply a variable that can stand for any letter. XR is the umbrella category that covers all the various forms of computer-altered reality, including Augmented Reality (AR), Mixed Reality (MR), and Virtual Reality (VR).

In one aspect, a testing device may be configured to perform one or more validation tests for an XR application being executed on a plurality of XR capable devices. The testing device may also include a testing robot or a simulator that is configured to mimic or replicate usage of the XR application on the XR capable device and/or execute a predetermined set of operations based at least on one or more of the validation tests being performed within a testing environment. The testing device can comprise an edge device that is operatively connected to a wireless communication network.

The testing device may be operated by a testing entity. In one aspect, the testing device receives, from the testing entity, an XR application executing on an XR capable device. The testing entity may be a telecommunications service provider or other such third parties. The XR application may utilize one or more software modules that are integrated into the XR application. The one or more software modules can comprise a Software Development Kit (SDK) that are provided by an Original Equipment Manufacturer (OEM) of an XR capable device. The SDK may include libraries, documentation (e.g., device specification), code samples, processes, guides, and/or other components of software tools and programs such as an Application Programming Interface (API).

The testing device may receive a request, from the testing entity, to perform one or more validation tests for the XR application executing on an XR capable device. The request may at least specify usage of the one or more software modules and include testing specifications corresponding to an XR capable device, wherein the testing specifications may specify which validation tests to apply. In some examples, the validation tests may include functional tests, performance tests, security tests, usability tests, compatibility tests, recoverability tests, regression tests, and/or so forth. The testing specifications may also include information relating to the operating system, file system, hardware, and/or other software systems of an XR capable device that includes the XR application.

In some aspect, the testing device may perform one or more validation tests for the XR application executing on multiple XR capable devices. The individual XR capable devices executing the XR application being validated may include different software features and hardware components. Accordingly, the individual XR capable devices may correspond to a set of testing configurations based at least on respective testing specifications. The one or more software modules and testing specifications may be locally stored at the testing device or at a database that is managed by the testing entity.

Before performing the one or more validation tests, the testing device may first map the XR application executing on the XR capable device to the one or more software modules such as the API of the SDK that is associated with the XR capable device. Upon performing the one or more validation tests for the XR application according to the testing specifications, the testing device may report or upload, via the API, test results, metrics, event data, and/or other such data to external systems such as a testing log that is managed by the testing entity and/or to an OEM of an XR capable device. The individual test results, metrics, event data, and/or other such data may be associated with a test case ID corresponding to a validation test.

In some aspects, at a testing device communicatively coupled to an XR capable device, the testing device may receive a request, from a testing entity, to perform one or more validation tests for an XR application executing on the XR capable device. The request may include a device identifier corresponding to the XR capable device. Based at least on the device identifier, the testing device may identify a device-specific library for the XR capable device and query the device-specific library to obtain testing specifications and one or more software modules that are available from the device-specific library. The device-specific library may be managed by an OEM of the XR capable device.

The testing device may perform multiple validation tests for multiple XR capable devices concurrently. Accordingly, the testing device may query multiple device-specific libraries in parallel, the individual device-specific libraries being managed by a unique OEM. In response to receiving testing specification and one or more software modules from the respective device-specific libraries, the testing device may map the individual testing specifications and one or more software modules to the XR application. The testing device executes one or more validation tests according to the testing specifications. Upon performing the one or more validation tests for the XR application, the testing device may report, via the one or more software modules, test results from the one or more validation tests to a testing log.

The testing log may be communicatively coupled to the testing and evaluation process monitoring server that may be operated by a testing entity. In some aspects, the testing and evaluation process monitoring server may store product requirements (e.g., implementation requirements, performance targets, service requirements, functions and features, quality requirements, customer experience/requirements, operations requirements, other technical requirements) and validation criteria (e.g., acceptance level, threshold for number of defects identified, expected result). Test data and test parameters for the validation tests may also be stored at a testing and evaluation process monitoring server. The testing and evaluation process monitoring server may receive the validation report from the testing log and validate the XR application based at least on the results in view of the product requirements and the validation criteria. In some embodiments, the testing device may also validate the XR application based at least on one or more of the results in the validation report during the validation process as one or more tests are being applied.

The techniques described herein may streamline the validation testing process for XR applications operating on multiple XR capable devices with, wherein the individual XR capable devices are associated with unique testing specifications and software modules for integrating with various XR applications. The techniques described herein may be implemented in a number of ways. Example implementations are provided below with reference to the following figures.

Example Network Architecture

Figure 1:
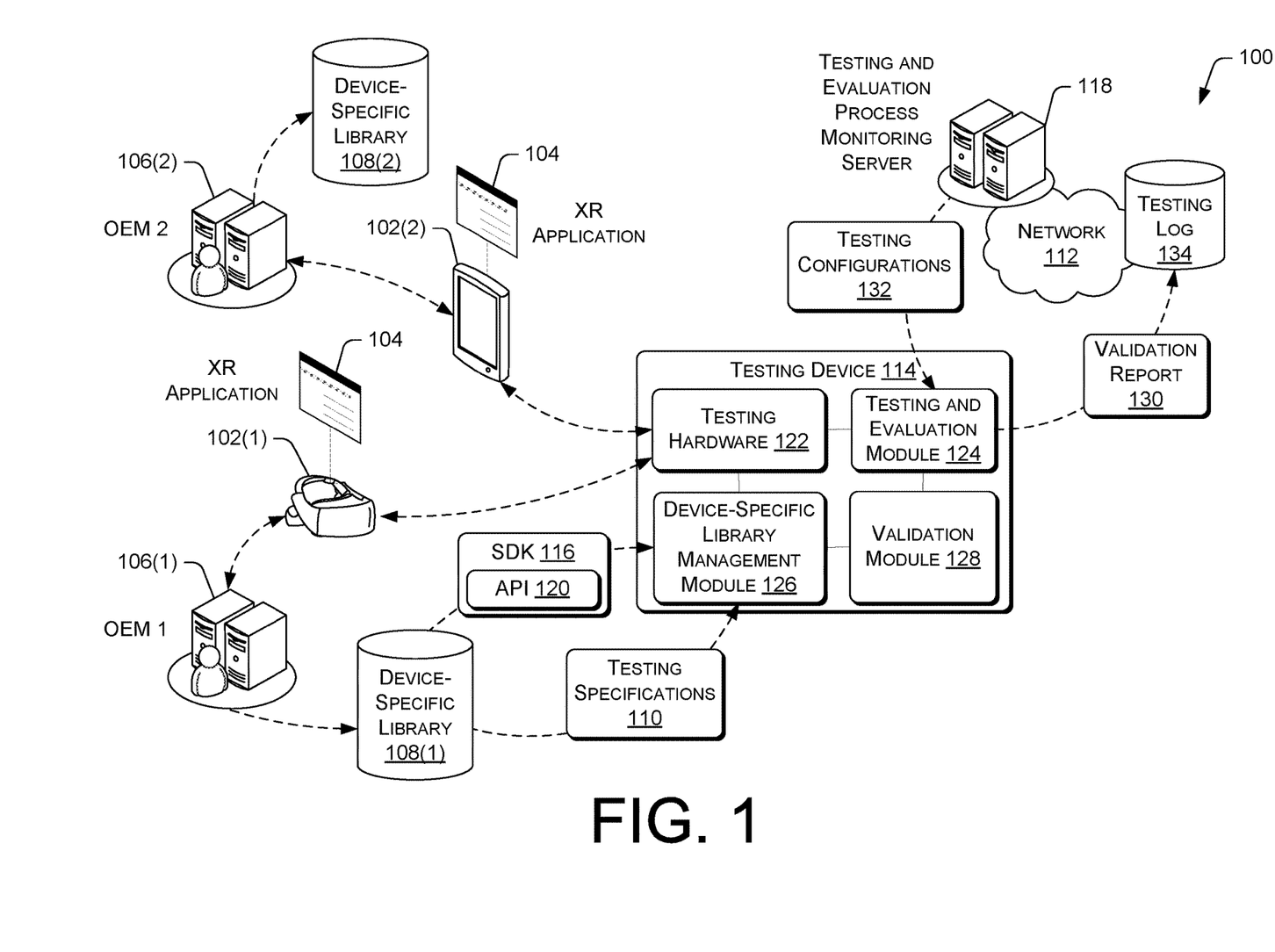
FIG. 1 illustrates an example of network architecture for onboarding XR capable devices to perform validation testing.

FIG. 1 illustrates an example architecture 100 for onboarding various XR capable devices to execute testing of an XR application. The architecture 100 may include one or more XR capable devices 102(1) and 102(2). The individual XR capable devices 102(1) and 102(2) may be produced or provided by an OEM 106(1) and 106(2), respectively. In FIG. 1, the first XR capable device 104(1) may be a head-mounted device (HMD) and the second XR capable device 104(2) may be a smartphone. In various embodiments, the XR capable devices 102(1) and 102(2) may be other mobile devices, personal digital assistants (PDAs), or other electronic devices having a wireless communication function that is capable of receiving input, processing the input, and generating output data. The XR capable devices 102(1) and 102(2) are connected to a telecommunication network 112 utilizing one or more wireless base stations or any other common wireless or wireline network access technologies.

The network 112 can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

In FIG. 1, each of the XR capable devices 102(1) and 102(2) includes an XR application 104. Examples of XR applications include architecture, visual art, commerce, education, emergency services, video games, medical, military, navigation, and workplace applications. In any of these applications, a user may wear the first XR capable device 102(1) such as an HMD to interact with one or more digitally-generated entities displayed by the first XR capable device 102(1). Additionally, a user may utilize the second XR capable device 102(2) such as a smartphone in order to interact with one or more digitally-generated entities displayed by the second XR capable device 102(2).

FIG. 1 also includes a testing and evaluation process monitoring server 118 that may store test data and test parameters for the validation tests. In one example, validation tests may include functional tests, performance tests, security tests, compatibility tests, recoverability tests, and/or so forth. Regression testing may also be performed after the desired changes or modifications are made to the existing code after completing one or more validation tests.

The functional tests generally evaluate whether the XR application 104 operates as specified in product requirements. In this regard, the functional tests may evaluate the interactions between individual software modules of the XR application 104. The functional tests may also evaluate the interactions between the software modules of the XR application 104 and the operating system, file system, hardware (e.g., input devices such as a microphone, a keyboard/keypad, mouse devices, a touch-sensitive display that accepts gestures, voice or speech recognition devices, hand gesture recognition devices, etc.), and/or other software systems of the XR capable devices 102(1) and 102(2) on which the XR application 104 resides. The functional tests may also validate whether the XR application 104 performs according to the requirement of all versions of mobile communication protocols (e.g., 3G, 4G, LTE, 5G, etc.). Further, the functional tests may validate whether the XR application 104 enables the XR capable devices 102(1) and 102(2) to display appropriate notifications and error messages.

The performance tests determine whether the XR application 104 performs acceptably under certain performance requirements (e.g., access by a large number of users) or different load conditions. For example, the performance tests may determine whether a network coverage can support the XR application 104 at a peak user level, an average user level, and a minimum user level. The performance tests may also determine whether the XR application 104 performs acceptably under certain performance requirements when a network is changed to Wi-Fi from a cellular network or vice versa while moving around with the XR capable device, or when only intermittent phases of connectivity are available.

The performance tests may further determine whether the existing client-server configuration setup provides the required optimum performance level (e.g., as specified under product requirements and/or evaluation criteria), and help identify various application and infrastructure bottlenecks which prevent the XR application 104 from performing at the required acceptability levels. Additionally, the performance tests may help validate whether the response time of the XR application 104 is as per the requirements. In some aspects, the performance tests may also evaluate whether the energy consumption (e.g., battery lifespan) of the XR capable devices 102(1) and 102(2) can support the XR application 104 to perform under projected load volumes.

The security tests may generally analyze the data storage and data validation requirements, enable the session management for preventing unauthorized users to access unsolicited information, and determine whether the business logic implementation is secured and not vulnerable to any attack from external systems. The compatibility tests generally determine whether the XR application 104 is compatible with the XR capable devices 102(1) and 102(2). The XR capable devices 102(1) and 102(2) may have different operating systems, resolution, screen, version, and hardware. For instance, the compatibility tests may validate that the user interface of the XR application 104 fits the screen size of the XR capable devices 102(1) and 102(2), such that no text or content on the user interface is only partially visible or inaccessible on the XR capable devices 102(1) and 102(2). The recoverability tests generally evaluate crash recovery and transaction interruptions. For example, the recoverability tests may determine how the XR application 104 handles recovery after unexpected interruption/crash scenarios. In another example, the recoverability tests validate how the XR application 104 handles transactions during a power failure or when a connection to a network is suspended.

The validation tests may be executed via a testing device 114. The testing device 114 can comprise a robotic device that is configured to mimic or replicate usage of the XR application 104 on the XR capable devices 102(1) and 102(2) and/or execute a predetermined set of operations based at least on one or more of the validation tests being performed within a testing environment. The testing device 114 may also include general-purpose computers, such as desktop computers, tablet computers, laptop computers, servers (e.g., on-premise servers, edge servers), or other electronic devices that are capable of receiving input, processing the input, and generating output data. The testing device 114 may store data in a distributed storage system, in which data may be stored for long periods and replicated to guarantee reliability.

The testing device 114 may be equipped with testing hardware 122 that may be configured to operate the XR capable devices 102(1) and 102(2). For instance, the testing hardware 122 may include an image capturing device or an image sensor, whereby the testing device 114 may be configured to support or wear the first XR capable device 102(1) (i.e., an HMD) such that the image capturing device or the image sensor may be aligned to view the display screen of the first XR capable device 102(1). In another example, the testing hardware 122 may include a robotic hand and/or digits that may be configured to secure a grasp around the second XR capable device 102(2) (i.e., a smartphone) and interact with the touchscreen of the second XR capable device 102(2).

Accordingly, the testing hardware 122 may include mechanical components for providing movement that is equivalent to human gesture (e.g., head movement, neck movement, arm movement, hand movement, finger movement, etc.) that may be communicatively coupled to a navigational or directional component in response to movement commands by a test administrator. The testing device 114 may also include additional user interface, data communication, or data storage hardware. For example, the user interfaces may include a data output device (e.g., visual display, audio speakers), and one or more data input devices (e.g., sensors) for receiving user input.

The testing device 114 comprises a testing and evaluation module 124 for performing one or more validation tests. Before conducting validation tests, however, the testing device 114 may initially onboard the XR capable devices 102(1) and 102(2). In one example, the testing device 114 may register the XR capable devices 102(1) and 102(2) with a server (e.g., testing and evaluation process monitoring server 118) of the testing entity by providing device identifiers (e.g., serial numbers), device type (e.g., HMD, smartphone, gaming apparatus, etc.), device model, manufacturer information, and/or so forth. Additionally, the testing device 114 may obtain testing specifications and one or more software modules from the XR capable devices' 102(1) and 102(2) OEMs 106(1) and 106(2).

In one example, to onboard the first XR capable device 102(1), the testing device 114 may query a first device-specific library 108(1) requesting testing specifications 110. The first device-specific library 108(1) may be maintained and operated by the first OEM 106(1) that produces the first XR capable device 102(1). Similarly, the second device-specific library 108(2) may be maintained and operated by the second OEM 106(2) that produces the second XR capable device 102(2). The device-specific libraries 108(1) and 108(2) in FIG. 1 may include logical organizational structures that store data, such as relational databases, object databases, object-relational databases, and/or key-value databases. Accordingly, the device-specific libraries 108(1) and 108(2) may store multiple records such as testing specifications 110 and one or more software modules.

In response to the query from the testing device 114, the device-specific library 108(1) may return available testing specifications 110 corresponding to an XR capable device 102(1). The testing specifications 110 may include information relating to the operating system, file system, hardware, and/or other software systems of the first XR capable device 102(1). In some aspects, the testing device 114 may provide the testing specifications 110 to the testing and evaluation process monitoring server 118. The testing specifications 110 may be stored locally at the testing device 114 and/or cached at the testing and evaluation process monitoring server 118. The testing and evaluation process monitoring server 118 is configured to provide testing configurations 132 to the testing device 114 based at least on the testing specifications 110. The testing configurations 132 may be based at least on product requirements and the evaluation criteria and may also instruct the testing device 114 which validation tests to apply and the pre-requisite for each test.

The testing device 114 may also query the first device-specific library 108(1) requesting one or more software modules associated with the first XR capable device 102(1). In the illustrated embodiment, the one or more software modules can comprise a Software Development Kit (SDK) 116. The SDK 116 may include libraries, documentation (e.g., device specification corresponding to the first XR capable device 102(1)), code samples, processes, guides, and/or other components of software tools and programs such as an Application Programming Interface (API) 120. In one example, the API 120 may be configured to facilitate communications of test events and other data related to validation testing between the first XR capable device 102(1) and/or the OEM 106(1) and one or more computing nodes or servers (e.g., testing device 114, testing and evaluation process monitoring server 118, testing log 134, etc.) of the testing entity. In response to the query, the device-specific library 108(1) may return SDK 116 corresponding to the first XR capable device 102(1).

The testing device 114 may include a device-specific library management module 126. The device-specific library management module 126 may include an interface component for communicating with the device-specific libraries 108(1) and 108(2) and other components of the testing device 114 such as the testing and evaluation module 124 and the validation module 128. In some aspects, the device-specific library management module 126 may use a header based authentication model to a request from the device-specific library 108(1) testing specifications 110 and/or one or more software modules (e.g., SDK 116). Authentication credentials may be associated with the testing device 114 and the testing entity. In some aspects, the authentication credentials may be associated with an account identifier for a test account, a developer account, and/or a beta account of the testing entity. As the testing device 114 performs multiple validation tests for multiple XR capable devices, the device-specific library management module 126 is configured to manage a data structure (e.g., a mapping table) stored in a local memory of the testing device 114 or a memory maintained at a testing entity. In some examples, the device-specific library management module 126 may implement a management logic for testing specifications and SDKs from multiple device-specific libraries 108(1) and 108(2) operated by one or more OEMs 106(1) and 106(2).

The testing device 114 comprises a validation module 128 that interfaces with the testing and evaluation module 124. Upon completing the validation testing, the validation module 128 may generate a validation report 130 to be transmitted, for example, via the API 120, to a testing log 134. The validation report 130 may include test results from the individual validation tests. Additionally, the validation report 130 may include other test events from the individual validation tests. The testing log 134 may interface with the testing and evaluation process monitoring server 118. In some aspects, the testing log 134 may pass the validation report 130 and/or event-related data to the testing and evaluation process monitoring server 118. The testing and evaluation process monitoring server 118 may also interface with OEMs 106(1) and 106(2) and a network provider to receive product requirements and evaluation criteria. In response to receiving the validation report 130, the testing and evaluation process monitoring server 118 may analyze the test results and perform validation of the XR application 104 based at least on the product requirements and the evaluation criteria.

If multiple validation tests are applied, the validation module 128 may analyze individual test results as the validation tests are completed in a sequence. If the validation module 128 determines that a test result from a first validation test indicates that the XR application is not validated at least in part, then the validation module 128 may instruct the testing and evaluation module 124 to terminate or suspend the validation testing process before completing additional validation tests and transmit the validation report 130 via the API 120 to the testing log 134. Alternatively, all of the validation tests may be completed before the validation module 128 validates the XR application 104.

Example Computing Device Components

Figure 2:
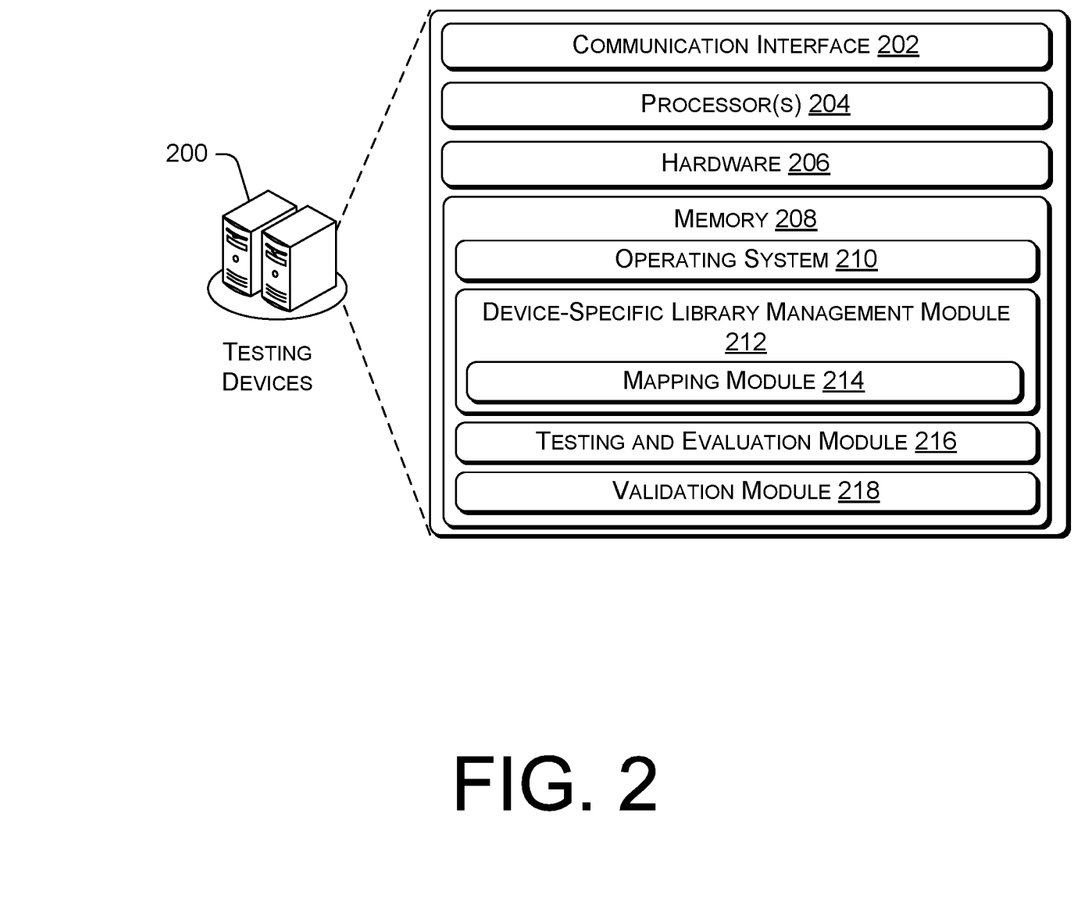
FIG. 2 is a block diagram showing various components of an illustrative edge device that performs validation testing for XR applications executed on various XR capable devices.

FIG. 2 is a block diagram showing various components of illustrative testing devices 200 that performs validation testing. It is noted that the testing devices 200 as described herein can operate with more or fewer of the components shown herein. For example, the testing devices 200 may include specific hardware or mechanical components for operating various types of XR capable devices such as HMD, smartphones, wearable devices, gaming apparatus, and/or so forth. Additionally, the testing devices 200 as shown herein or portions thereof can serve as a representation of one or more of the computing devices of the present system.

The testing devices 200 may include a communication interface 202, one or more processors 204, hardware 206, and memory 208. The communication interface 202 may include wireless and/or wired communication components that enable the testing devices 200 to transmit data to and receive data from other networked devices. In at least one example, the one or more processor(s) 204 may be a central processing unit(s) (CPU), graphics processing unit(s) (GPU), both a CPU and GPU, or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the testing devices 200.

The processors 204 and the memory 208 of the testing devices 200 may implement an operating system 210, a device-specific library management module 212, a testing and evaluation module 216, and a validation module 218. The operating system 210 may include components that enable the testing devices 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The device-specific library management module 212 may correspond to the device-specific library management module 126 of FIG. 1. The device-specific library management module 212 is configured to interface with one or more device-specific libraries and/or other external systems operated or controlled by OEMs to onboard XR capable devices for validation testing. In some aspects, the device-specific library management module 212 may send a request for testing specifications and/or one or more software modules (e.g., SDK) and manage the received testing specifications and SDKs from multiple device-specific libraries operated by one or more OEMs. For example, the device-specific manager 212 may implement management logic to identify the XR capable device executing an XR application being validated and identify requisite and available testing specification and/or one or more software modules from a device-specific library associated with the XR capable device.

The device-specific library management module 212 includes a mapping module 214. The mapping module 214 is configured to process or analyze the request for testing specifications and/or one or more software modules to identify a target device-specific library associated with the request or characterize the request as associated with a specific OEM and/or a specific XR capable device. In some aspects, the request may include a device identifier that is associated with an XR capable device and an OEM. Accordingly, the mapping module 214 may implement OEM identifier detector logic that may cause the requests including device identifiers to be mapped to individual device-specific libraries that are associated with target OEM identifiers. The mapping module 214 may populate a mapping table with information to indicate how requests from the device-specific library management module 212 are mapped or routed to specific device-specific libraries.

Similarly, the mapping module 214 may populate a mapping table with information to indicate how information from the device-specific libraries is mapped to an XR application executing on an XR capable device. In some aspects, the mapping module 214 may be configured to map the one or more software modules from a device-specific library to the XR application executing on the XR capable device associated with the OEM that manages the device-specific library. For instance, the mapping modules 214 may map one or more APIs of the SDK to the XR application executing on the XR capable device. The API may be an Onboard Device API to enable the testing devices 200 to add or register the XR capable device to a test account during an onboard process. The API may also be a Delete Device API to enable the testing devices 200 to delete or remove the XR capable device from a test account. Additionally, the API may be a Get Events API to download validation test events and test results from the testing devices 200 to the testing entity such as the testing and evaluation process monitoring server and/or the testing log.

The testing and evaluation module 216 may correspond to the testing and evaluation module 124 of FIG. 1. The testing and evaluation module 216 is configured to perform one or more validation tests based at least on test configurations. The validation tests may include functional tests, performance tests, security tests, usability tests, compatibility tests, recoverability tests, regression tests, and/or so forth. In some aspects, the testing and evaluation module 216 may prioritize one or more validation tests according to the test configurations. Additionally, the testing and evaluation module 216 may assign individual validation tests to one or more computing instances of the testing devices 200.

The validation module 218 may correspond to the validation module 128 of FIG. 1. The validation module 218 may receive the test results from the testing and evaluation module 216 to generate a validation report and transmit the validation report to a testing log. In some aspects, the validation module 218 may analyze test results generated by one or more computing instances that execute one or more validation tests to determine whether the XR application is validated. The validation module 218 may analyze test results as individual validation tests are completed (e.g., in a sequence). Accordingly, the validation module 218 may instruct the testing and evaluation module 216 to terminate testing if one or more test results indicate that the XR application is not validated. Conversely, the validation module 218 may analyze test results when all validation tests are completed. In some aspects, the validation module 218 may analyze the test results in accordance with product requirements and evaluation criteria. Accordingly, the validation module 218 may indicate in the validation report whether the XR application is validated.

Figure 3:
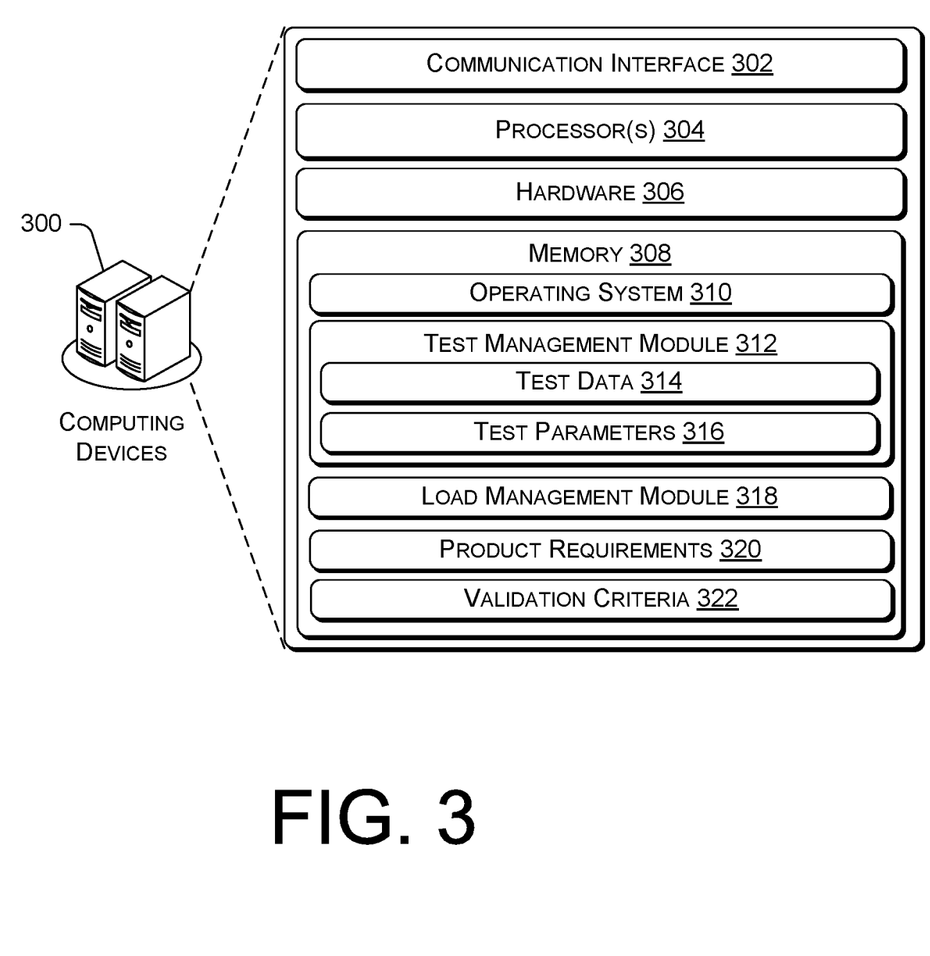
FIG. 3 is a block diagram showing various components of an illustrative computing device that onboards XR capable devices for validation testing.

FIG. 3 is a block diagram showing various components of illustrative computing devices 300 that manages validation testing and testing configurations. It is noted that the computing devices 300 as described herein can operate with more or fewer of the components shown herein. Additionally, the computing devices 300 as shown herein or portions thereof can serve as a representation of one or more of the computing devices of the present system.

The computing devices 300 may include a communication interface 302, one or more processors 304, hardware 306, and memory 308. The communication interface 302 may include wireless and/or wired communication components that enable the computing devices 300 to transmit data to and receive data from other networked devices. In at least one example, the one or more processor(s) 304 may be a central processing unit(s) (CPU), graphics processing unit(s) (GPU), both a CPU and GPU, or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the computing devices 300.

The processors 304 and the memory 308 of the computing devices 300 may implement an operating system 310, a test management module 312, and a load management module 318. The operating system 310 may include components that enable the computing devices 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The test management module 312 may manage test data 314 and test parameters 316 for one or more validation tests. The test data 314 may be created manually, by using data generation tools, or retrieved from an existing production environment. Similarly, the test parameters 316 may be created manually, by using parameter generation tools or retrieved from an existing production environment. If created manually, the test parameters 316 may replace hard-coded values. In some aspects, parameter values for the test parameters 316 specified may be derived from another test or test script. For example, one or more of the parameter values may be derived from a previously performed validation test.

Additionally, the test management module 312 may generate testing configurations based at least on testing specifications from a device-specific library. In one example, the testing configurations may specify which validation tests to apply. The testing configurations may also identify which computing instance to instantiate in the testing and evaluation pipeline, and further assign individual computing instances to execute one or more validation tests.

During testing, the load management module 318 may be configured to act as a load balancer for one or more computing instances in a testing and evaluation pipeline. In some aspects, the load management module 318 may assign validation tests to the individual computing instances upon determining that an output queue for a computing instance is full. Upon completion of the one or more validation tests, the test management module 312 may receive a validation report from the testing and evaluation pipeline via a testing log. In turn, the test management module 312 may analyze the test results in the validation report to perform validation of the XR application based at least on product requirements 320 and evaluation criteria 322.

Example Processes

Figure 4:
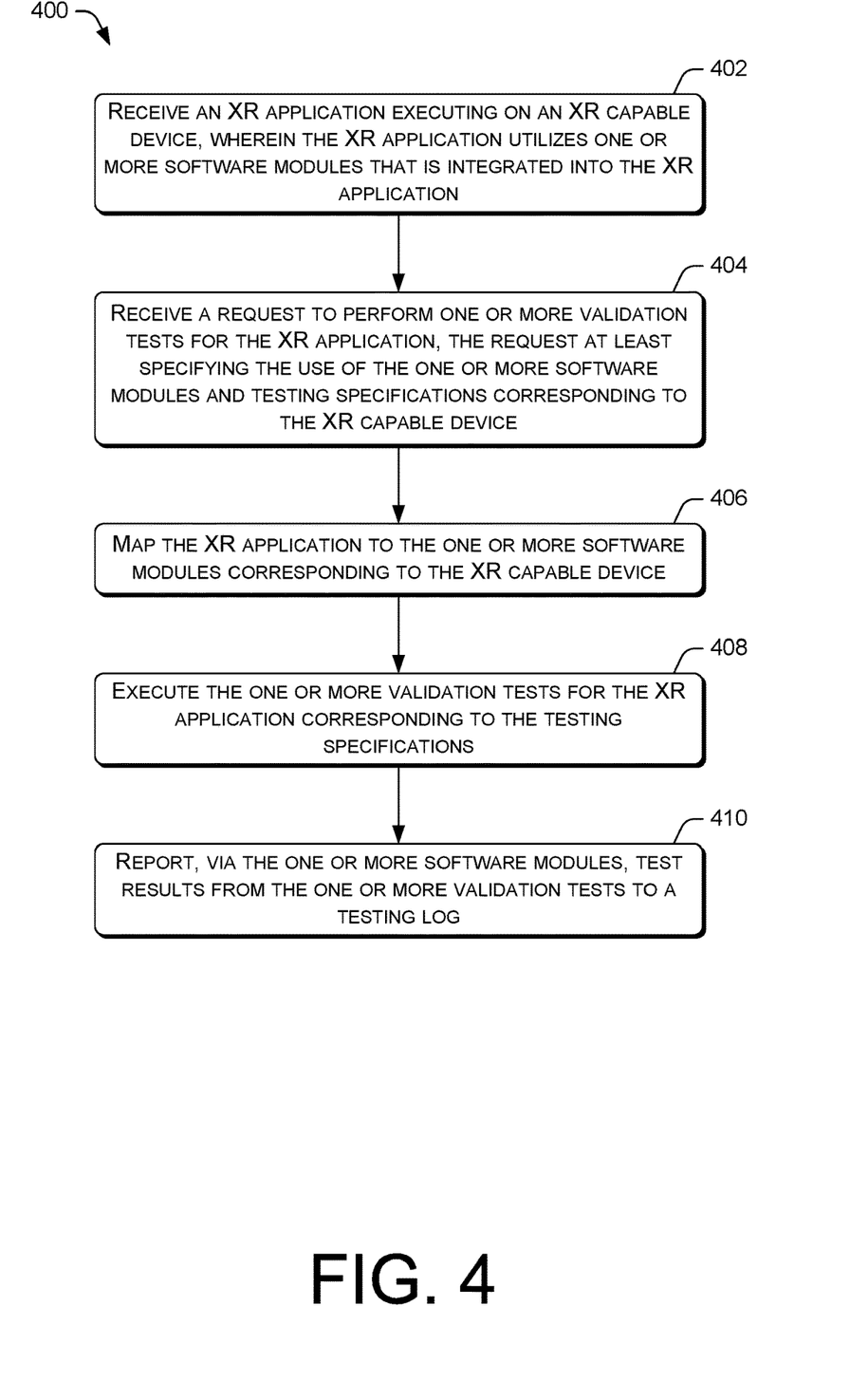
FIG. 4 is a flow diagram of an example process for onboarding XR capable devices for performing validation testing.
Figure 5:
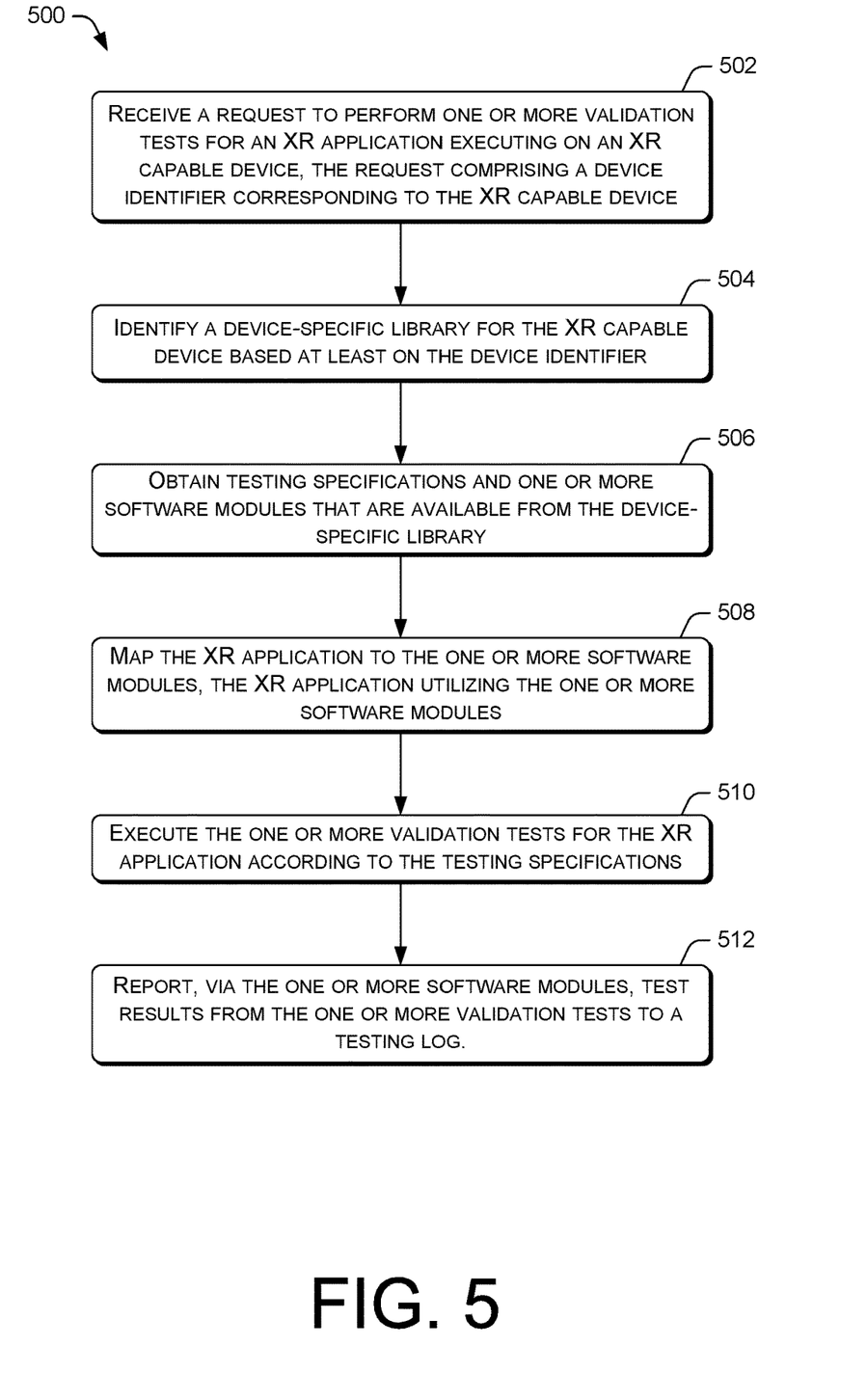
FIG. 5 is a flow diagram of an example process for identifying device-specific libraries based at least on XR capable devices performing validation testing.

FIGS. 4 and 5 present illustrative processes 400-500 for performing validation tests from the perspective of one or more testing devices. The processes 400-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-500 are described with reference to FIGS. 1-3.

FIG. 4 is a flow diagram of an example process 400 for onboarding XR capable devices for performing validation testing from a perspective of a testing device. At block 402, a testing device, via a testing and evaluation module, receives an XR application executing on an XR capable device. The XR capable device may be registered with a testing and evaluation process monitoring server of a testing entity. The XR capable device may comprise various types of devices associated with a unique OEM. The XR application utilizes one or more software modules such as an SDK that is configured to be integrated into the XR application.

At block 404, the testing and evaluation module may receive a request to perform one or more validation tests for the XR application. The request may be transmitted from a testing entity and can specify the usage of the one or more software modules and testing specifications corresponding to the XR capable device. In some aspects, the testing and evaluation module may interface with a device-specific library management module of the testing device to receive testing specifications from one or more device-specific libraries maintained by OEMs. The testing specifications may include information relating to the operating system, file system, hardware, and/or other software systems of the XR capable device that includes the XR application.

At block 406, a mapping module of the device-specific library management module maps the XR application executing on the XR capable device to the one or more software modules. In one example, the mapping module may map the XR application to an API of the SDK. The API may enable one or more computing nodes of the testing entity to download validation test events from the testing device. At block 408, the testing and evaluation module executes the one or more validation tests for the XR application according to the testing specifications. The validation tests may include functional tests, performance tests, security tests, usability tests, compatibility tests, recoverability tests, regression tests, and/or so forth. One or more of these tests may be applied in a predefined sequence.

At block 410, a validation module of the testing device may report, via the one or more software modules, test results from the one or more validation tests to a testing log. In some aspects, the validation module may validate the XR application executing on the corresponding XR device based at least on test results and one or more evaluation criteria. For example, the validation may include comparing each set of the test results to corresponding evaluation criteria. Accordingly, the test result generated by each computing instance may be determined to be validated when a set of test results meet corresponding evaluation criteria.

FIG. 5 is a flow diagram of an example process for identifying device-specific libraries based at least on XR capable devices performing validation testing, from the perspective of a testing device. At block 502, a testing and evaluation module of the testing device receives a request to perform one or more validation tests for an XR application executing on an XR capable device. The request may be transmitted from a testing entity and can include a device identifier corresponding to the XR capable device. At block 504, a device-specific library management module of the testing device identifies a device-specific library for the XR capable device based at least on the device identifier (e.g., device serial number). In one example, the device-specific library management module includes a mapping module that may implement OEM identifier detector logic that may cause the requests including device identifiers to be mapped to individual device-specific libraries that are associated with target OEM identifiers. The mapping module may populate a mapping table with information to indicate how requests from the device-specific library management module are mapped or routed to specific device-specific libraries.

At block 506, the device-specific library management module obtains testing specifications and one or more software modules such as an SDK that are available from the device-specific library. In one example, the device-specific library management module may identify a device-specific library for the XR capable device and query the device-specific library to obtain testing specifications and one or more software modules that are available from the device-specific library. At block 508, the mapping module of the device-specific library management module maps the XR application to the one or more software modules. In some aspects, the mapping module may populate an additional mapping table with information to indicate how information from the device-specific libraries is mapped to an XR application. At block 510, the testing and evaluation module executes the one or more validation tests for the XR application according to the testing specifications. The one or more validation tests may be performed concurrently for an XR application executing on one XR capable device. Additionally, or alternatively, the one or more validation tests may be performed in a sequence for individual XR capable devices. At block 512, a validation module of the testing device reports via the one or more software modules, test results from the one or more validation tests to a testing log. The test results may also be downloaded from the testing device to a computing node at the testing entity via an API of the SDK.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving an XR application executing on an XR capable device, wherein the XR application utilizes one or more software modules that are integrated into the XR application;

receiving a request to perform one or more validation tests for the XR application, the request at least specifying usage of the one or more software modules and testing specifications corresponding to the XR capable device;

mapping the XR application to the one or more software modules corresponding to the XR capable device;

executing the one or more validation tests for the XR application according to the testing specifications; and reporting, via the one or more software modules, test results from the one or more validation tests to a testing log.

2. The one or more non-transitory computer-readable media of claim 1, wherein the acts further comprise:

validating the XR application based at least on the test results and one or more evaluation criteria.

3. The one or more non-transitory computer-readable media of claim 1, wherein the one or more software modules comprise a Software Development Kit (SDK) that is provided by an Original Equipment Manufacturer (OEM) of the XR capable device.

4. The one or more non-transitory computer-readable media of claim 3, wherein the acts further comprise:

mapping the XR application to an Application Programming Interface (API) of the Software Development Kit (SDK).

5. The one or more non-transitory computer-readable media of claim 1, wherein the acts further comprise:

selecting the one or more validation tests to perform based at least on the testing specifications.

6. The one or more non-transitory computer-readable media of claim 1, wherein the acts further comprise:

receiving product requirements for the XR capable device from an Original Equipment Manufacturer (OEM) of the XR capable device; and validating the XR application executing on the XR capable device based at least on the product requirements.

7. The one or more non-transitory computer-readable media of claim 6, wherein the acts further comprise:

selecting the one or more validation tests to perform based at least on the product requirements.

8. The one or more non-transitory computer-readable media of claim 1, wherein the acts further comprise:

receiving an additional request to perform an additional validation test based at least on the test results; and executing the additional validation test for the XR application according to the testing specifications.

9. The one or more non-transitory computer-readable media of claim 1, wherein the testing specifications are stored in a device-specific library of an Original Equipment Manufacturer (OEM).

10. The one or more non-transitory computer-readable media of claim 1, wherein the XR capable device comprises a head-mounted device (HMD).

11. A computer-implemented method, comprising:

at a testing device communicatively coupled to an XR capable device, the testing device having one or more processors and memory:

receiving a request to perform one or more validation tests for an XR application executing on the XR capable device, the request comprising a device identifier corresponding to the XR capable device;

identifying a device-specific library for the XR capable device based at least on the device identifier;
obtaining testing specifications and one or more software modules that are available from the device-specific library;
mapping the XR application to the one or more software modules, the XR application utilizing the one or more software modules;
executing the one or more validation tests for the XR application according to the testing specifications; and
reporting, via the one or more software modules, test results from the one or more validation tests to a testing log.

12. The computer-implemented method of claim 11, further comprising:
validating the XR application based at least on the test results and one or more evaluation criteria.

13. The computer-implemented method of claim 11, wherein the one or more software modules comprise a Software Development Kit (SDK) that is provided by an Original Equipment Manufacturer (OEM) of the XR capable device.

14. The computer-implemented method of claim 13, further comprising:
mapping the XR application to an Application Programming Interface (API) of the Software Development Kit (SDK).

15. The computer-implemented method of claim 11, further comprising:
receiving product requirements for the XR capable device from an Original Equipment Manufacturer (OEM) of the XR capable device; and
validating the XR application executing on the XR capable device based at least on the product requirements.

16. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
receive an XR application executing on an XR capable device, wherein the XR application utilizes one or more software modules that are integrated into the XR application;
receive a request to perform one or more validation tests for the XR application, the request at least specifying usage of the one or more software modules corresponding to the XR capable device and testing specifications corresponding to the XR capable device;
map the XR application executing on the XR capable device to the one or more software modules;
execute the one or more validation tests for the XR application according to the testing specifications; and
report, via the one or more software modules, test results from the one or more validation tests to a testing log.

17. The system of claim 16, wherein the one or more processor is further configured to:
validate the XR application based at least on the test results and one or more evaluation criteria.

18. The system of claim 16, wherein the one or more software modules comprise a Software Development Kit (SDK) that is provided by an Original Equipment Manufacturer (OEM) of the XR capable device.

19. The system of claim 18, wherein the one or more processor is further configured to:
map the XR application to an Application Programming Interface (API) of the Software Development Kit (SDK).

20. The system of claim 16, wherein the one or more processor is further configured to:
receive product requirements for the XR capable device from an Original Equipment Manufacturer (OEM) of the XR capable device; and
validate the XR application executing on the XR capable device based at least on the product requirements.

\* \* \* \* \*